United States Patent [19]

Horiuchi et al.

[11] Patent Number: 5,407,998
[45] Date of Patent: Apr. 18, 1995

[54] GOLF BALL AND METHOD FOR THE PRODUCTION THEREOF

[75] Inventors: Kuniyasu Horiuchi; Akira Kato, both of Kobe, Japan

[73] Assignee: Sumitomo Rubber Industries, Ltd., Hyogo, Japan

[21] Appl. No.: 114,165

[22] Filed: Sep. 1, 1993

[30] Foreign Application Priority Data

Sep. 1, 1992 [JP] Japan .................................. 4-258947

[51] Int. Cl.$^6$ ........................ A63B 37/12; C08L 33/02
[52] U.S. Cl. ................................. 525/133; 273/235 R; 525/192; 525/193; 525/194; 525/195; 525/196; 525/221; 524/908; 524/522
[58] Field of Search .................... 273/235 R; 525/194, 525/196, 221, 193, 192, 133

[56] References Cited

U.S. PATENT DOCUMENTS

| | | | |
|---|---|---|---|
| 3,384,612 | 5/1968 | Brandt et al. | 260/41 |
| 3,454,676 | 7/1969 | Busse | 260/897 |
| 3,701,702 | 10/1972 | Shickman et al. | 525/240 |
| 4,409,366 | 10/1983 | Schmelzer | 525/196 |

FOREIGN PATENT DOCUMENTS 0031709 7/1981 European Pat. Off. .

*Primary Examiner*—Carman J. Seccuro, Jr.
*Attorney, Agent, or Firm*—Birch, Stewart, Kolasch & Birch

[57] ABSTRACT

The present invention provides a golf ball with preferred hit feeling, controllability and satisfactory level of flying performance and cut resistance. The golf ball comprises a core and a cover covering the core, wherein said cover is mainly made of a mixture composed of an ionomer resin and a diene type rubber at a weight ratio (ionomer resin:diene rubber) of 95:5-60:40 and said diene type rubber is crosslinked by a crosslinking agent.

6 Claims, No Drawings

GOLF BALL AND METHOD FOR THE PRODUCTION THEREOF

FIELD OF THE INVENTION

The present invention relates to a golf ball with preferred hit feeling and controllability and a satisfactory level of flying performance and cut resistance and a method of producing the golf ball.

DESCRIPTION OF THE RELATED ART

In recent years, ionomer resin has been frequently used as cover resin for golf balls (e.g., Japanese Kokai Publication Sho 49[1974]-49727). Especially in the case of a two-piece ball which employs a solid core, ionomer resin is used for the cover resin in most cases, because the ionomer resin has excellent durability, cut resistance and impact resilience and yet is easy to process and is cheaper than other resins usable for the cover.

Also, it has been proposed recently to use a terpolymer of ethylene, methacrylic acid and an acrylate as a part of the cover material (e.g. Japanese Kokai Publication Hei 1[1989]-308577) or to use a mixture of a vulcanized natural rubber latex or synthetic rubber latex and an ionomer resin latex as the cover material (e.g. Japanese Kokai Publication Sho 57[1982]-188270), in order to improve hit feeling and controllability (ease of providing spin) of golf balls.

The golf ball which uses the terpolymer as a part of the cover material, however, has very poor flying performance.

The golf ball employing the latex mixture as the cover material has poor durability and cut resistance, because the cover material is obtained by mixing the ionomer resin latex after vulcanizing the rubber latex and therefore there is no mutual reaction between the rubber and the ionomer resin. Also, since the cover material contains the ionomer resin latex, molding of the cover is complicated requiring much labor which makes the process unprofitable.

Japanese Kokai Publication Sho 55[1980]-133440 proposes a process wherein a mixture of an ionomer resin and an ethylene-α-olefinic copolymer rubber is employed and the ethylene-α-olefinic copolymer rubber thereof is partially crosslinked with an organic peroxide. However, the organic peroxide crosslinks not only the copolymer rubber but also the ionomer resin, and does not sufficiently improve hit feeling and controllability.

As indicated above, various trials have been made to improve hit feeling and controllability of golf balls but sufficient effect has not been obtained.

SUMMARY OF THE INVENTION

The present inventors have continued strenuous effort for the development of the resin to be used for the cover of golf balls, aiming at the improvement of hit feeling and controllability of the balls and yet securing good flying performance and cut resistance.

Thus, the present invention provides a golf ball which comprises a core and a cover covering the core, wherein the cover is mainly made of a mixture composed of an ionomer resin and a diene type rubber at a weight ratio (ionomer resin:diene rubber) of 95:5–60:40 and the diene type rubber is crosslinked by a crosslinking agent.

In the present invention, the diene type rubber is added and mixed into ionomer resin and the diene type rubber alone is crosslinked. By introducing the resulting crosslinked diene type rubber into the ionomer resin, the ionomer resin is made flexible, the hit feeling and controllability of the resulting golf ball are improved. In addition thereto, due to the reaction and entangling of the molecules of the ionomer resin and the diene type rubber at their boundary, durability and cut resistance of the ball are also improved.

Especially when crosslinking of the diene type rubber is conducted during the mixing process with the ionomer resin, more uniform mixing of the ionomer resin and crosslinked diene type rubber may be achieved and a golf ball with preferred characteristics is obtained.

In the present invention, in addition to the above, by specifying an amount of the diene type rubber to be mixed into the ionomer resin, the deterioration of the impact resilience and cut resistance of ionomer resin is minimized and a golf ball with satisfactory level of flying performance and cut resistance is obtained.

DETAILED DESCRIPTION OF THE INVENTION

The ionomer resin used in the present invention may be a copolymer of 10–20 wt % of an $\alpha,\beta$-unsaturated carboxylic acid having 3–8 carbon atoms and 80–90 wt % of an $\alpha$-olefin, of which a part of the carboxylic groups is neutralized by metal ion (e.g. sodium ion, lithium ion, zinc ion, magnesium ion and the like).

The diene type rubber to be mixed into the ionomer resin may be ethylene propylene diene rubber (EPDM), isoprene rubber (including natural rubber), butadiene rubber, styrene butadiene rubber, acrylonitrile butadiene rubber, etc.

The crosslinking agent to crosslink said diene type rubber may be one generally used for crosslinking diene type rubber except peroxides, for example, dimethylolphenol compound, phenol formaldehyde resin, m-phenylenebismaleimide, a mixture of m-phenylenebismaleimide and dibenzothiazolsulfide (DM), sulfur, tetraethylthiuramdisulfide (TMTD), mixture of sulfur and tetraethylthiuram disulfide, a mixture of tetraethylthiuramdisulfide and zinc stearate (ZnSt) and the like.

The amount of the crosslinking agent is preferred to be in the range of 0.1–10 wt parts based on 1.00 wt parts of the diene type rubber. When the amount of crosslinking agent is less than 0.1 wt part based on 100 wt parts of diene type rubber, practically no crosslinking of the diene type rubber occurs and as the result, the flying distance of the ball is shorter, whereas if the amount of the crosslinking agent is more than 10 wt parts based on 100 wt parts of the diene type rubber, too much crosslinking of diene type rubber occurs, and the flowability of the mixture of the diene type rubber and the ionomer resin remarkably decreases and processability of the mixture becomes inferior.

The weight ratio of the mixture of the ionomer resin and the diene type resin is required to be 95:5–60:40. When the amount of diene type rubber is smaller than the above range, flexibility of the product is insufficient and improvement of hit feeling and controllability of the ball is not obtained. When the amount of diene type rubber is larger than the above range, cut resistance remarkably decreases and flying performance also deteriorates and the golf ball with satisfactory physical characteristics is not obtained.

The cover material used in the present invention is preferably to have a stiffness of 1,000–3,500 kgf/cm$^2$.

When the stiffness of the cover material is larger than 3,500 kgf/cm², the ball is too hard and improvement of hit feeling and controllability of the ball is not obtained, whereas if stiffness is smaller than 1,000 kgf/cm², cut resistance is remarkably damaged, flying performance deteriorates and a golf ball with satisfactory physical property is not obtained.

In the present invention, the indispensable components of the covering material are the ionomer resin, the diene type rubber and the crosslinking agent and upon necessity, various additives, for example, pigment, dispersant, UV ray absorbing agent, optical stabilizer etc. As it is evident from the above description, the term "mainly composed of" is meant both that the cover material is solely made from the ionomer mixture and the cover material contains the ionomer mixture and the above mentioned additives.

The cover material is usually prepared by mixing the ionomer resin and the diene type rubber by an ordinary resin extruder or a closed mixer.

However, when they are mixed by the extruder, the ionomer resin and the diene type rubber may be sprinkled with the bridging agent before mixing, or the crosslinking agent may be added during extrusion by the extruder.

When they are mixed by the closed mixer, it is preferred to mix the ionomer resin and the diene type rubber first and then add crosslinking agent, followed by mixing them again.

In either of the above cases, it is preferred to control the temperature of the mixture at 150°–270° C., particularly at 180°–250° C. When the temperature of the mixture is less than 150° C., uniform dispersion of the ionomer resin and diene type rubber is not achieved, durability decreases and satisfactory physical properties are difficult to obtain and the time to crosslink the diene type rubber increases, thus making the process inefficient. When the temperature of the mixture is higher than 270° C., scorching OCCURS.

The cover material of the present invention may be used with the core of either a solid golf ball or a thread-wound golf ball.

In the case of the core of a solid golf ball, it may be used for the core of two-piece golf ball or multi-piece golf ball composed of more than three layers. For example, the core of two-piece golf ball may be made by compounding 100 wt parts of polybutadiene with, for example, 10–60 wt parts of a co-crosslinking agent such as α,β-monoethylenic unsaturated carboxylic acid (e.g. acrylic acid or methacrylic acid etc.) or their metal salt, a functional monomer (e.g. trimethylolpropane trimethacrylate), 10–30 wt parts of filler, such as zinc oxide or barium sulfate, 0.5–5.0 wt parts of a peroxide, such as dicumyl peroxide, 0.1–1.0 wt part of antioxidant to form a rubber composition which is then press-vulcanized, for example at a temperature of 140° to 170° C. for 10 to 40 minutes in a spherical mold.

The core of the thread-wound golf ball is composed of a center and a thread rubber layer wound on the center, the center being either liquid type or rubber type. The rubber type center may be obtained by vulcanizing the rubber composition the same as that described above for the solid golf ball core.

The rubber thread may be the conventionally used one, for instance those obtained by vulcanizing the rubber composition comprising, for instance, natural rubber or natural rubber plus synthetic polyisoprene, antioxidant, vulcanization accelerator, sulfur, etc. The aforesaid core for solid golf ball or the thread-wound golf ball are simply examples and the present invention is not limited to those cited above.

The method of applying the cover to the core is not specifically restricted but may be a method conventionally practiced. For instance, the said specific cover material is formed into a half-shell shape and the core is wrapped with two such half shells followed by pressure forming at 130°–170° C. for 1–5 min. The cover material may also be formed directly by injection molding.

The thickness of the cover is normally about 1.0–3.0 mm. When forming the cover, dimples are formed upon necessity at the surface of the ball or after forming of the cover, it may be finished by painting or it may be stamped upon necessity.

EXAMPLES

Hereunder are described the present invention more concretely by citing examples. However, the present invention is not limited to the examples.

Examples 1–9 and Comparative Examples 1–4

100 wt parts of cis-1,4-polybutadiene (SR BR01 (tradename) manufactured by Japan Synthetic Rubber Co.) is mixed with 30 wt parts of zinc acrylate (manufactured by Nippon Shokubai Kagaku Kogyo Co.), 20 wt parts of zinc oxide (manufactured by Toho Zinc Co.) and 1 wt part of dicumyl peroxide (manufactured by Nippon Oils & Fats Co.) and the mixture was formed under pressure in a metal mold for the core at 150° C. for 30 minutes to obtain the core of 38.5 mm in diameter used for the solid golf ball.

Separately, the compounding materials shown in Tables 1 and 2 were mixed to prepare the cover material. In Tables 1 and 2 (especially in Table 1), the compounding materials are indicated in simplified form to fit into the limited space while additional descriptions are described hereunder after Table 2.

The amounts of compounding materials shown in Table 1-2 are by weight parts and Examples 1–9, Comparative Examples 1–4 set the amount of polymer components (ionomer resin, diene type rubber etc.) at 100 wt parts. Although it is not shown in Tables 1–2, both for the Examples 1–9 and Comparative Examples 1–4, 2 wt parts of white pigment made of titanium oxide (TiO$_2$) is added to 100 wt parts of polymer components.

TABLE 1

| | Example | | | | | | | | |
|---|---|---|---|---|---|---|---|---|---|
| | 1 | 2 | 3 | 4 | 5 | 6 | 7 | 8 | 9 |
| Himilan | | | | | | | | | |
| 1605*1 | 40 | 40 | 40 | 45 | 20 | 40 | 40 | 40 | 20 |
| 1557*2 | 40 | 40 | 40 | 45 | 50 | 40 | 40 | 40 | 60 |
| 1706*3 | — | — | — | — | — | — | — | — | — |
| AD8269*4 | — | — | — | — | — | — | — | — | — |
| K9720*5 | 20 | 20 | 20 | 10 | 30 | — | — | — | 20 |
| BR11*6 | — | — | — | — | — | 20 | — | — | — |
| IR2200*7 | — | — | — | — | — | — | 20 | — | — |
| TP301*8 | — | — | — | — | — | — | — | 20 | — |
| Tackyroll | | | | | | | | | |
| 250*9 | 0.3 | — | — | 0.3 | 0.3 | — | 0.3 | — | 1.0 |
| TMTD*10 | — | — | — | — | — | 1.0 | — | — | — |
| ZnSt*11 | — | — | — | — | — | 1.0 | — | — | — |
| Balnock*12 | — | 0.5 | 0.5 | — | — | — | — | — | — |
| MBTS*13 | — | 0.5 | — | — | — | — | — | — | — |
| Sulfur | — | — | — | — | — | — | — | 2 | — |

TABLE 2

|  | Comparative Example | | | |
|---|---|---|---|---|
|  | 1 | 2 | 3 | 4 |
| Himilan |  |  |  |  |
| 1605*1 | 50 | 5 | 20 | 40 |
| 1557*2 | — | 30 | 30 | 40 |
| 1706*3 | 50 | 5 | 15 | — |
| AD8269*4 | — | 60 | 35 | — |
| K9720*5 | — | — | — | 20 |
| BR11*6 | — | — | — | — |
| IR2200*7 | — | — | — | — |
| TP301*8 | — | — | — | — |
| Tackyroll |  |  |  |  |
| 250*9 | — | — | — | — |
| TMTD*10 | — | — | — | — |
| ZnSt*11 | — | — | — | — |
| Balnock*12 | — | — | — | — |
| MBTS*13 | — | — | — | — |
| Sulfur | — | — | — | — |

*1: Himilan 1605 (tradename); ionomer resin neutralized by natrium, MI (melt index) = 2.8, manufactured by Mitsui Dupont Chemical.
*2: Himilan 1557 (tradename); ionomer resin neutralized by zinc ion, MI = 5.5, manufactured by Mitsui DuPont Chemical Co.
*3: Himilan 1706 (tradename); ionomer resin nuetralized by zinc ion, MI = 0.7, manufactured by Mitsui Dupont Chemical Co.
*4: AD8269 (tradename); ternary copolymer of ethylene -methacrylate - acrylate ester neutralized by natrium ion, manufactured by Mitsui DuPont Polychemical Co.
*5: Mitsui Elastomer-K9720 (tradename); ethylene propylene diene rubber (EPDM), manufactured by Mitsui Petrochemical Co., Ltd.
*6: BR11 (tradename); high-cis-polybutadiene, manufactured by Japan Synthetic Rubber Co.
*7: IR2200 (tradename); high-cis-polyisoprene; manufactured by Japan Synthetic Rubber Co.
*8: TP301 (tradename); transpolyisoprene manufactured by Kuraray Co.
*9: Tackyroll (tradename); brominated alkylphenol formaldehyde resin, crosslinking agent manufactured by Taoka Chemical Co., Ltd.
*10: TMTD = tetramethylthiuram disulfide, crosslinking agent.
*11: ZnSt = zinc stearate, crosslinking agent.
*12: Balnock PM (tradename); N, N'-m-phenylene-bis-maleimide, crosslinking agent.
*13: MBTS = dibenzothiazyl disulfide, crosslinking agent.

The cover material of Examples 1–9 was prepared in the following manner. The cover material of Examples 1–8 was prepared by mixing ionomer resin, diene type rubber, crosslinking agent, titanium oxide etc. in a blender and mixing them under heating in an ordinary extruder and pelletizing.

The cover material of Example 9 was obtained by mixing ionomer resin, diene type resin and titanium oxide in a closed blender, adding crosslinking agent, mixing them three more minutes and pelletizing in ordinary extruder.

Stiffness of the cover material of Example 1 was 2,100 kgf/cm$^2$, stiffness of the cover material of Example 2 was 2,050 kgf/cm$^2$, stiffness of the cover material of Example 3 was 2,000 kgf/cm$^2$, stiffness of the cover material of Example 4 was 2,600 kgf/cm$^2$, stiffness of the cover material of Example 5 was 1,500 kgf/cm$^2$, stiffness of the cover material of Example 6 was 1,950 kgf/cm$^2$, stiffness of the cover material of Example 7 was 1,900 kgf/cm$^2$, stiffness of the cover material of Example 8 was 2,000 kgf/cm$^2$ and stiffness of the cover material of Example 9 was 1,900 kgf/cm$^2$.

The cover materials of Comparative Examples 1–4 were mixed and pelletized by an extruder according to the ordinary method. The thus obtained cover material was directly covered on the core of solid golf ball by injection molding to obtain a two-piece solid golf ball which subsequently was finished by painting. The diameter of thus obtained golf ball was 42.8 mm.

Weight, ball compression (PGA), initial flying speed, and carry of the thus obtained golf ball were measured. The results are shown in Table 3. The methods of measurement of the initial speed and carry were as follows:

Initial Speed
According to the R & A initial speed measuring method.

Carry
A golf ball was hit by a No. 1 wood at a head speed of 45 m/sec., using a swing robot manufactured by Throughtemper Co. and the carry was also measured. Measurement was made on 10 balls for each kind of ball and the result was shown by their average value.

TABLE 3

|  | Ball Weight | Ball compression (PGA) | Initial velocity (feet/sec.) | Carry (yard) |
|---|---|---|---|---|
| Example 1 | 45.3 | 89 | 251.9 | 226 |
| Example 2 | 45.3 | 89 | 251.9 | 226 |
| Example 3 | 45.3 | 89 | 251.9 | 226 |
| Example 4 | 45.9 | 92 | 252.1 | 227 |
| Example 5 | 45.2 | 87 | 251.7 | 225 |
| Example 6 | 45.3 | 88 | 251.8 | 225 |
| Example 7 | 45.3 | 88 | 251.8 | 225 |
| Example 8 | 45.3 | 89 | 251.9 | 226 |
| Example 9 | 45.3 | 89 | 251.9 | 225 |
| Comparative Example 1 | 45.3 | 99 | 252.3 | 227 |
| Comp. Ex. 2 | 45.3 | 87 | 249.5 | 220 |
| Comp. Ex. 3 | 45.2 | 92 | 250.5 | 221 |
| Comp. Ex. 4 | 45.3 | 89 | 250.3 | 221 |

As shown in Table 3, the carry of the golf balls of Examples 1–9 was 225–227 yard which was roughly equivalent to the carry of the golf ball of Comparative Example 1 which was the conventional ball and practically no decrease of carry due to mixing of diene type rubber into ionomer resin was noticed. Whereas, the golf balls of Comparative Examples 2–3 in which terpolymer of ethylene-methacrylate-acrylate ester was mixed into ionomer resin or the golf ball of Comparative Example 4 in which ethylene-propylene-diene rubber (EPDM) was mixed into ionomer resin indicated the carry of 220–221 yard which was by 4–7 yard inferior to those of the golf balls of Examples 1–9 or Comparative Example 1. Next the hit feeling and controllability of the golf balls of Examples 1–9 and Comparative Examples 1–4 were evaluated by actual hitting test by 10 professional golfers.

In the test, the thread-wound golf balls covered with the cover mainly made of transpolyisoprene (Balata) were used as the control and evaluation was made on how the golf balls of Examples 1–9 and Comparative Examples 1–4 compare to the thread-wound golf balls with regard to the hit feeling and controllability. The results are shown in Table 5.

TABLE 5

|  | Hit feeling | Controllability |
|---|---|---|
| Example 1 | Equivalent to thread-wound golf ball | Equivalent to thread-wound golf ball |
| Example 2 | Equivalent to thread-wound golf ball | Equivalent to thread-wound golf ball |
| Example 3 | Equivalent to thread-wound golf ball | Equivalent to thread-wound golf ball |
| Example 4 | Equivalent to thread-wound golf ball | Equivalent to thread-wound golf ball |
| Example 5 | Equivalent to thread-wound golf ball | Equivalent to thread-wound golf ball |
| Example 6 | Equivalent to thread-wound golf ball | Equivalent to thread-wound golf ball |
| Example 7 | Equivalent to | Equivalent to |

TABLE 5-continued

|  | Hit feeling | Controllability |
| --- | --- | --- |
| Example 8 | Equivalent to thread-wound golf ball | Equivalent to thread-wound golf ball |
| Example 9 | Equivalent to thread-wound golf ball | Equivalent to thread-wound golf ball |
| Comparative Ex 1 | Harder than thread-wound golf ball | More difficult to give spin and less controllable than thread-wound golf ball |
| Comparative Ex. 2 | Harder than thread-wound golf ball | More difficult to give spin and less controllable than thread-wound golf ball |
| Comparative Ex. 3 | Harder than thread-wound golf ball | More difficult to give spin and less controllable than thread-wound golf ball |
| Comparative Ex. 4 | Harder than thread-wound golf ball | More difficult to give spin and less controllable than thread-wound golf ball |

As shown in Table 5, the golf balls of Examples 1–9 indicated the preferred hit feeling and controllability equivalent to the thread-wound golf balls but the golf ball of Comparative Example 1 indicated a rigid hit feeling, difficulty in giving spin and poor controllability.

At the time of evaluation of hit feeling and controllability in the actual hitting test by professional golfers, the carry was also measured. As for the golf balls of Examples 1–9 and Comparative Example 1, the carry was at the satisfactory level but as for the golf balls of Comparative Examples 2–4, the carry was inferior and the evaluation by actual hitting test by professional golfers agreed with the result of evaluation using a swing robot.

Furthermore, in order to investigate the cut resistance of the golf balls of Examples 1–9 and Comparative Examples, 1–4, a pitching wedge was fixed on the swing robot manufactured by Throughtemper Co. and the ball was hit at an angle to cut the ball at the speed of 30 m/sec. and the generation of cutting-injury was investigated. As a result, no cutting injury was produced on the golf balls of Examples 1–9 and Comparative Example 1 but on the golf balls of Comparative Examples 2–4, small cutting injuries were produced.

Cut resistance was investigated under the same conditions with the thread-wound golf balls covered with the cover made mainly of transpolyisoprene (Balata) but on this ball, a large cutting injury which makes the ball practically unusable was produced.

As described above, the present invention provides a golf ball with preferred hit feeling, controllability and indicating the satisfactory level of flying performance and cut resistance.

What is claimed is:

1. A golf ball comprising a core and a cover covering the core, wherein said cover has a stiffness of 1,000–3,500 kgf/cm$^2$ and is made of a mixture composed of an ionomer resin and a diene type rubber at a weight ratio (ionomer resin:diene rubber) of 95:5–60:40 and said diene rubber alone is crosslinked by a non-peroxide crosslinking agent for said diene rubber wherein said cover has been prepared by mixing said ionomer resin and said diene type rubber, and said crosslinking agent is added thereto during said mixing whereby only said diene rubber is crosslinked.

2. The golf ball according to claim 1 wherein said ionomer resin is a copolymer of 10–20 wt % of an $\alpha,\beta$-unsaturated carboxylic acid having 3–8 carbon atoms and 80–90 wt % of an $\alpha$-olefin, of which a part of carboxylic groups is neutralized by metal ion.

3. The golf ball according to claim 1 wherein said diene type rubber is selected from the group consisting of ethylene propylene diene rubber (EPDM), isoprene rubber, natural rubber, butadiene rubber, styrene butadiene rubber, acrylonitrile butadiene rubber, and mixtures thereof.

4. The golf ball according to claim 1 wherein said crosslinking agent is selected from the group consisting of a dimethylolphenol compound, phenol formaldehyde resin, m-phenylenebismaleimide, a mixture of m-phenylenebismaleimide and dibenzothiazolsulfide (DM), sulfur, tetraethylthiuramdisulfide (TMTD), a mixture of sulfur and tetraethylthiuram disulfide, a mixture of tetraethylthiuramdisulfide and zinc stearate (ZnSt), and mixtures thereof.

5. The golf ball according to claim 1 wherein said cover further comprises additves.

6. The golf ball according to claim 5 wherein the additives are selected from the group consisting of pigment, dispersant, UV ray absorbing agent, optical stabilizer and mixtures thereof.

* * * * *